March 24, 1925.
A. CARLSON
SAFETY DEVICE FOR BUCKET CONVEYERS
Filed March 14, 1924   2 Sheets-Sheet 1
1,530,478
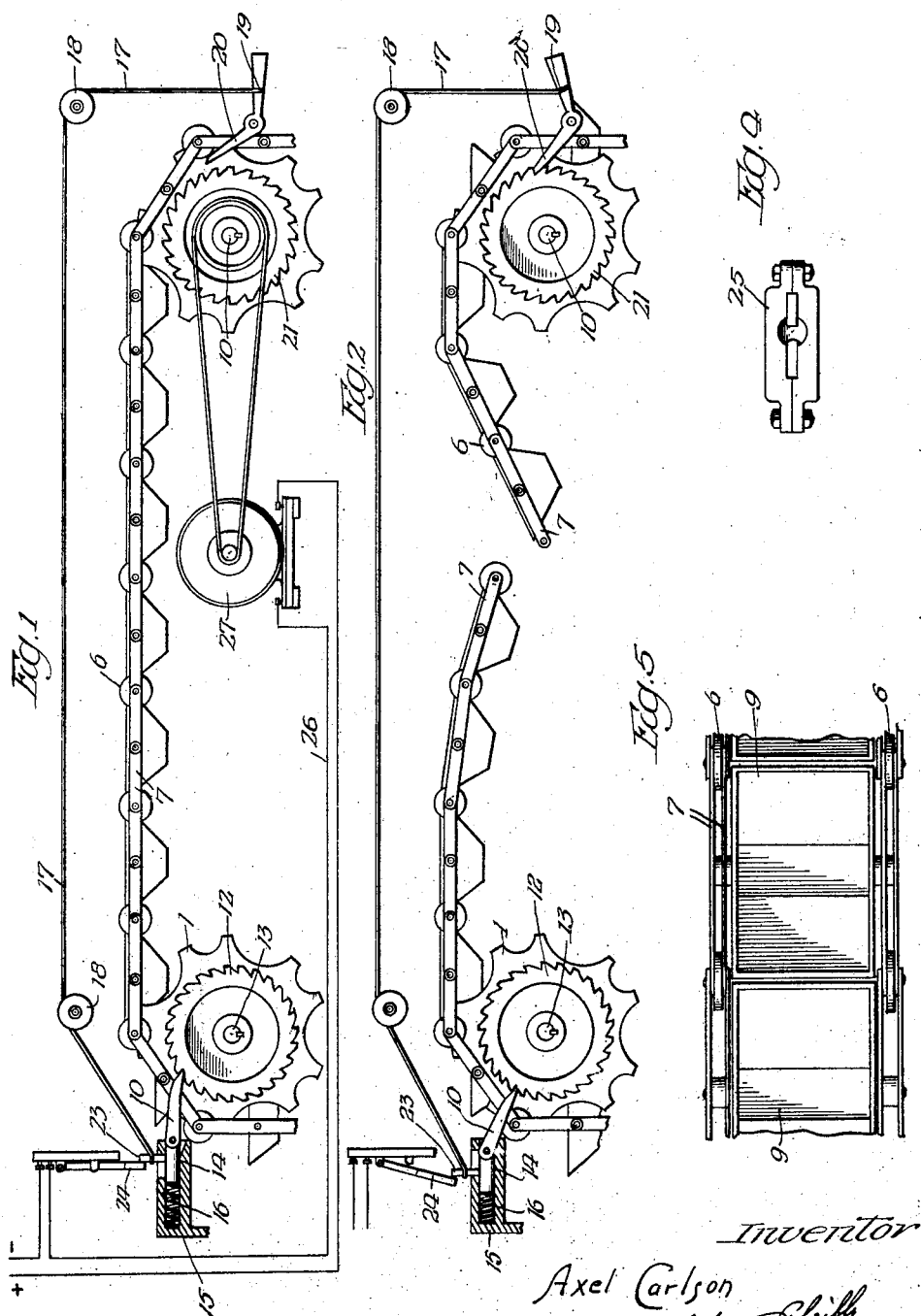

March 24, 1925. 1,530,478
A. CARLSON
SAFETY DEVICE FOR BUCKET CONVEYERS
Filed March 14, 1924 2 Sheets-Sheet 2
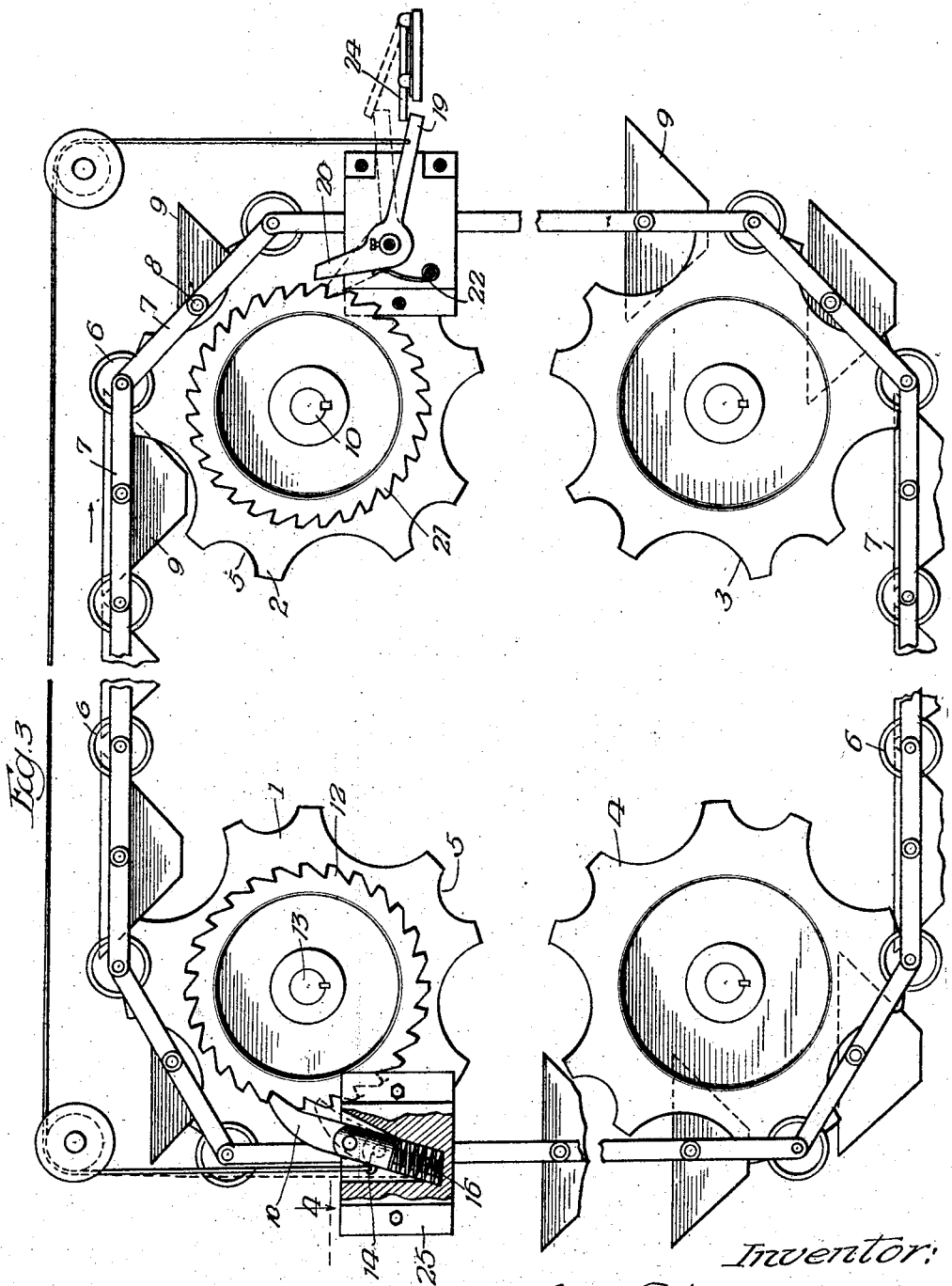
Inventor:
Axel Carlson Patented Mar. 24, 1925.

1,530,478

UNITED STATES PATENT OFFICE.

AXEL CARLSON, OF CHICAGO, ILLINOIS.

SAFETY DEVICE FOR BUCKET CONVEYERS.

Application filed March 14, 1924. Serial No. 699,198.

*To all whom it may concern:*

Be it known that I, AXEL CARLSON, a citizen of the United States, residing at Chicago, Illinois, have invented certain new and useful Improvements in a Safety Device for Bucket Conveyers; and I do hereby declare the following to be a full, clear, and exact description of the invention, such as will enable others skilled in the art to which it appertains to make and use the same.

This invention relates to safety devices for bucket conveyers. Generally speaking, the objects of the present invention are those of quickly and automatically stopping various parts of the conveyer mechanism so as to prevent (or at least reduce) the damage caused by a breakage of other parts while the mechanism is in operation. More particularly, my invention relates to bucket conveyers and to prevent both a general slackening of the endless chain or chains forming part of such a conveyer system in case of a breaking of the chain, and also to prevent a further actuating of the propelling parts in case of such breakage.

In one of its desirable applications, my invention is particularly suitable for use with conveyers of the type in which buckets or other carriers are mounted on endless chains and are carried through a given path, the chains being trained over suitable sprocket wheels so as to guide the buckets in the desired path. Such conveyer systems are often used for considerable stretches between the wheels over which the chains are trained, and in case of a breakage of a chain, the severed portions of the latter are then pulled down by gravity in opposite directions, causing serious damage to the conveyer parts and also to adjacent pieces of machinery or adjacent parts of the building in which the conveyer is used. To avoid, or at least greatly reduce, such a damage, my invention aims to provide simple means for automatically latching some of the wheels over which the conveyer chain is trained, and desirably also for automatically halting the driving of the conveyer in case of such a break. Still further and more detailed objects will appear from the following specification and from the accompanying drawings, in which—

Fig. 1 shows a largely diagrammatic view of the upper portion of a conveyer system forming one embodiment of my invention, with the safety mechanism of my invention in its normal or inoperative position.

Fig. 2 shows the same immediately after the conveyer chain has been ruptured and with the safety elements already actuated by my mechanism.

Fig. 3 is a fragmentary elevation showing another embodiment of my invention, with the mounting for the actuating pawl partly cut away to show the arrangement of the latter.

Fig. 4 is a plan view of the actuating pawl of Fig. 3 and of the mounting for this pawl, taken along correspondingly numbered line in Fig. 3.

Fig. 5 is a fragmentary plan view of a portion of the conveyer of Fig. 3, showing the arrangement of the supports for the chain and the buckets.

In the embodiment of Fig. 3, I have shown my invention as applied to a conveyer mechanism of a type commonly used for conveying coal, ashes or the like and including an endless chain which is trained over four sprocket wheels 1, 2, 3 and 4 in such a manner that one part of the chain moves upwardly and another downwardly. Each of these sprocket wheels has a series of peripheral grooves 5 adapted to engage rollers 6 spacing the links 7 of the conveyer chains, which links are arranged in laterally opposed pairs connected by cross-bars 8 on which the buckets 9 are hung. Motion is imparted to the conveyer system through one of the sprocket wheels, as for example by rotating a shaft 10 to which the sprocket wheel 2 is fastened, the rotation in this case being in a clockwise direction in Fig. 3.

With the parts thus arranged and the shaft 10 connected to suitable driving means, the successive engagement of the rollers 6 with the grooves 5 in the companion sprocket wheels 2 propels the conveyer chain, while the other pairs of sprocket wheels 1, 3 and 4 serve as idlers in guiding the chain through the desired path and in keeping this chain taut. In case any part of such a chain breaks, as for example at the middle of the upper stretch in Fig. 3, the continued power-actuated rotation of the shaft 10 will cause the sprocket 2 to carry the adjacent severed end of the chain over this sprocket, whereupon this part of the chain will collapse by gravity and fall on the chain portions below the same and on the sprockets 3.

At the same time, the left-hand portion of the severed chain will be pulled downward by the weight of the left-hand vertical stretch of the chain, thus causing this portion (together with any contents of its buckets) to descend forcibly. In practice, the weight of the chain and bucket parts alone are usually sufficient to cause serious damages under such conditions, and the contents of the buckets add to the impact and hence to the damage which may be done both to the machinery and to the building when such a break occurs. Moreover, any accident which cripples a conveyer is apt to tie up the operation of other parts of the plant, so that the total damage often runs into large figures.

To prevent or at least reduce such damages, I provide a safety arrangement for causing a reverse or downward movement of the normally upward moving vertical part of the chain to lock both of the upper sprocket wheels over which the chain is trained. For this purpose, I desirably employ ratchet wheels associated with both of these upper sprocket wheels, a pair of pawls respectively engaging the two ratchet wheels, and a connection between the two pawls. One of the two pawls thus employed, namely the one associated with the sprocket wheel over which the chain passes upwardly, is continuously in engagement with the adjacent ratchet wheel and is mounted so that it can be moved longitudinally by the action of the ratchet wheel when the latter is reversed in direction. This latter pawl has its said longitudinal movement resisted by a spring and may be mounted in a number of different positions. Thus, Fig. 1 shows it as mounted for bodily movement in a horizontal direction and Fig. 3 for movement in a downward direction.

Referring first to Fig. 1, my safety arrangement as disclosed in that figure includes a pawl continuously riding on a ratchet wheel 12 fastened to the shaft 13 which carries the idler sprocket 1 over which the chain 7 moves upwardly. This pawl 11 is pivoted to a pawl-carrier 14 which is normally slid forward on a suitable support 15 by a spring 16. The slide 14 is also connected by a cord 17 trained over suitable idler wheels 18 to a lever 19 fastened to a pivoted pawl 20. The pawl 20 is adapted to engage a wheel 21 fast upon the shaft 10 and having its teeth oppositely directed to those of the ratchet wheel 12, but this pawl is normally out of engagement with the ratchet wheel.

With the parts thus arranged, it will be seen from Fig. 1 that in the ordinary operation of the conveyer, the pawl 10 will ride freely over the consecutive teeth of the ratchet wheel 12, while the companion pawl 20 is normally out of engagement with the ratchet wheel 21. However, if the conveyer chain is ruptured (as shown in Fig. 2) the weight of the vertical chain portion which normally moves upwards towards the sprocket 1, together with the weight of the filled buckets carried by this chain portion will reverse the normal direction of rotation of the sprocket 1, the shaft 13 and the ratchet wheel 12, thereby causing this ratchet wheel to move the pawl 11 longitudinally towards the left in Fig. 1. When this occurs, the pawl 11 moves the pawl-carrier 14 to the left against the pressure of the spring 16, thereby pulling the cord 17 to the left and raising the lever 19, so that the latter swings the pawl 20 into engagement with the ratchet wheel 21. Consequently, the action of the weight of one part of the chain in reversing the movement of the idler 1 automatically latches the sprocket 2 so as to keep the right-hand vertical portion of the chain from descending. However, since the conveyer is driven through the shaft 10, such a positive halting of the sprocket of this shaft might overstrain some portion of the driving means, such as the electric motor in case the conveyer is motor driven, I therefore preferably also provide means for automatically halting the driving when the reversing of the sprocket wheel 1 sets the latch on the companion sprocket wheel. For this purpose, Fig. 1 shows the pawl-carrier 14 as carrying a rigid arm 23 engaging the lever 24 of an electric switch controlling the circuit 26 to the motor 27 which drives the conveyer. Normally, the arm 23 leaves the switch lever 24 freely in its circuit-closing position, but when the pawl carrier 14 is moved to the position of Fig. 2, it automatically throws the lever of this switch, thereby rupturing and halting the power for driving the conveyer.

However, while I have just described the operation of the safety features of my mechanism when employed in the embodiment of Figs. 1 and 2, I do not wish to be limited to the details of the construction and arrangement thus disclosed, it being obvious that numerous additions, omissions or other changes might be made without departing from the spirit of my invention. For example, instead of mounting the pawl-carrier 14 for horizontal sliding, the latter may be slidably mounted in an inclined bore between a pair of guide plates 25 as shown in Fig. 3, and the action of gravity in normally holding the companion pawl 20 out of engagement with the ratchet wheel 21 may be assisted by a spring 22. So also, instead of actuating the motor-controlled switch through an arm on the pawl-carrier, the switch lever 24 may be operated by the same lever 19 to which the pawl 20 is fastened, as shown in Fig. 3. In other words, my invention aims broadly to cover the idea of halting the driving upon a rupturing of a conveyer chain, of halting both vertical stretches of the ruptured chain against retraction, and of effecting all of this halting by simple ratchet means associated with some part of the conveyer mechanism.

I claim as my invention:—

1. In a conveyer having an endless chain intermeshed with a sprocket, a ratchet wheel on the sprocket, a pivoted pawl normally engaged with the ratchet, a slidable spring pressed carrier for the pawl, and means for limiting pivotal movement of the pawl into its operative position, whereby upon rupture of the chain and reverse movement of the sprocket the pawl may move to engage the ratchet and stop its movement.

2. In a conveyer having an endless chain intermeshed with a sprocket, a ratchet wheel on the sprocket, a housing having a stop on an end thereof, a slidable spring pressed carrier in the housing and a pawl pivoted to the carrier and normally engaging the ratchet whereby upon rupture of the chain and reverse movement of the sprocket the pawl will be moved against the stop and held thereby to stop movement of the sprocket.

3. In a conveyer having an endless chain intermeshed with a pair of spaced sprockets, means actuated by a reverse movement of one of the sprockets for latching the latter against reverse rotation and means operated by the first means for also latching the other sprocket.

4. In a conveyer having an endless chain intermeshed with a pair of sprockets spaced along the chain, means actuated by a reverse rotary movement of the rearward sprocket for latching the said sprocket against continued reverse rotation and means operated by the first means for latching the forward sprocket against forward rotation.

5. In a conveyer, an endless chain and driving means therefor, means to render the driving means inoperative, a sprocket in mesh with the chain, a ratchet wheel on the sprocket, a spring pressed slidable pawl carrier, a pawl pivoted to the carrier and engaging the ratchet and movable to slide the carrier upon reverse movement of the chain and thereby the ratchet when the chain is ruptured, means to restrict movement of the pawl to a position where same holds the ratchet wheel against movement and means on the carrier to engage and operate the means to render the driving means inoperative when said carrier is actuated by the pawl upon reverse movement of the chain and thereby the ratchet.

6. In a conveyer, an endless chain and driving means therefor, means to render the driving means inoperative, a sprocket intermeshed with the chain and having a ratchet wheel connected thereto, means to actuate said means for rendering the driving means inoperative, spring means for normally holding said actuating means inoperative, a pivoted pawl normally engaged with the ratchet wheel and carried by said actuating means, and means which upon rupture of the chain and reverse movement of the sprocket holds the pawl in a position to stop movement of the sprocket.

7. In a conveyer, an endless chain and driving means therefor, means to render the driving means inoperative, slidable spring pressed means to actuate said means for rendering the driving means inoperative, means connected to said slidable means for actuating same upon rupture of the chain and for arresting reverse movement of one part of the chain, means to arrest forward movement of another part of the chain upon rupture of the latter, and means operated by the spring pressed means to actuate the means for arresting forward movement of said other part of the chain.

8. In a conveyer mechanism, a pair of sprockets, an endless chain trained over the sprockets and normally moving upwards towards one sprocket and downwardly away from the second sprocket, means actuated by a reverse movement of the chain for latching the first named sprocket against reverse rotational movement and means operated by the first means for latching the second sprocket against continued forward rotation.

9. In a conveyer mechanism, a pair of sprockets, an endless chain trained over the sprockets and normally moving upwards towards one sprocket and downwardly away from the second sprocket, means actuated by a reverse rotational movement of one of the sprockets for latching the first named sprocket against reverse rotation and means operated by the first means for latching the second sprocket against continued forward rotation.

10. In a conveyer mechanism, a pair of sprockets, an endless chain trained over the sprockets and normally moving upwards towards one sprocket and downwardly away from the second sprocket, separate means actuated by a rupturing of the chain for latching the said first and second sockets respectively against reverse and forward rotation and means to operate one of said means by the other thereof.

11. In a conveyer mechanism, a pair of sprockets, an endless chain trained over the sprockets and normally moving in one direction, ratchet wheels respectively fast upon the two sprockets, a pawl continuously engaging one ratchet wheel and arranged for freely permitting forward rotation thereof, a second pawl normally out of engagement with the other ratchet wheel but adapted to engage the latter to prevent forward rotation thereof, and means connecting the two pawls and actuated by the effect on the first named pawl of a reverse rotational movement of the ratchet wheel associated therewith for moving the second pawl into engagement with the second ratchet wheel.

12. In a conveyer mechanism, a pair of sprockets, an endless chain trained over the sprockets and normally moving in one direction, ratchet wheels respectively fast upon the two sprockets, a pawl continuously engaging one ratchet wheel and arranged for freely permitting forward rotation thereof, a second pawl normally out of engagement with the other ratchet wheel but adapted to engage the latter to prevent forward rotation thereof, a carrier for the first named pawl adapted to be moved out of its normal position by a reverse movement of the first ratchet wheel, and means actuated by a movement of the said pawl-carrier for moving the second pawl into engagement with the second ratchet wheel.

13. Conveyer mechanism as per claim 12, in combination with means for driving the conveyer, and means actuated by the movement of the said pawl-carrier for halting the driving means.

14. Conveyer mechanism as per claim 11, in which the said means comprise a lever associated with the second pawl and a flexible member connecting the said lever with the first named pawl.

Signed at Chicago, Illinois, March 5th, 1924.

AXEL CARLSON.